(12) United States Patent
Gentile et al.

(10) Patent No.: US 6,545,976 B1
(45) Date of Patent: Apr. 8, 2003

(54) MEASUREMENT OF NETWORK PROTECTION SWITCH TIME

(75) Inventors: Gerald T. Gentile, Palm Harbor, FL (US); Kenneth T. Myers, Palm Harbor, FL (US); John S. Datin, Tarpon Springs, FL (US)

(73) Assignee: King of Fans, Inc., Ft. Lauderdale, FL (US)

( * ) Notice: Subject to any disclaimer, the term of this patent is extended or adjusted under 35 U.S.C. 154(b) by 0 days.

(21) Appl. No.: 09/159,633

(22) Filed: Sep. 24, 1998

(51) Int. Cl.[7] .............................................. G01R 31/08
(52) U.S. Cl. ...................................... 370/216; 370/242
(58) Field of Search ................................. 370/216, 217, 370/218, 221, 219, 241, 242, 244, 254, 222, 252, 225, 248; 375/224, 225, 228; 714/703, 704, 48

(56) References Cited

U.S. PATENT DOCUMENTS

| | | | |
|---|---|---|---|
| 5,623,474 A | * 4/1997 | Oshio | 369/124 |
| 5,627,837 A | * 5/1997 | Gillet | 370/217 |
| 6,167,062 A | * 12/2000 | Hershey | 370/503 |
| 6,256,291 B1 | * 7/2001 | Araki | 370/216 |
| 6,310,911 B1 | * 10/2001 | Burke | 375/224 |
| 6,343,068 B1 | * 1/2002 | Yamamoto | 370/242 |

* cited by examiner

*Primary Examiner*—Douglas Olms
*Assistant Examiner*—Ricardo M. Pizarro
(74) *Attorney, Agent, or Firm*—Holland & Knight LLP

(57) ABSTRACT

This invention precisely and automatically measures the protection switch time of modern communication networks such as the SONET or SDH standard. An automated precision measurement device is provided which uses digital error detection and gated counter techniques to accurately measure the time required for a network element to switch from a defective line to a protected line for the purpose of delivering error free service to customer premises. The device accepts a line side signal, demultiplexes a payload test pattern from the standard mapping, and analyzes the payload pattern for errors. If errors are present, the device further measures the time that the errors persist (e.g., the time between the first error present to the last error present, inclusive). If the measurement was made during a protection switch event in the network element, then this time represents an accurate measurement of the protection switch time that affected the service. Alternatively, the device will measure the signal with embedded test pattern as demultiplexed from the terminal itself yielding a measurement from a customer interface point.

8 Claims, 1 Drawing Sheet

Invention to precisely, and automatically, measure the protection switch time of a telecomunications network

MEASUREMENT OF NETWORK PROTECTION SWITCH TIME

FIELD OF THE INVENTION

This invention relates to an improved method and device for measuring the time for automatic protection switching incorporated in modern communication network elements.

BACKGROUND OF THE INVENTION

Modern communication networks such as the SONET standard or the SDH standard are designed to be very robust and survive failures such as fiber optic cable cuts and nodal malfunctions. Modern network elements incorporate a mechanism known as automatic protection switching which permits the network to automatically switch from a defective communication line to a protected line.

The SONET standards (ANSI T1.105 and T1.106), for example, specify that once invoked, a protection switch is required to occur in less than 50 milliseconds (with an objective of 25 milliseconds). It is important that the SONET network elements accomplish this switch time in less than the 50 millisecond specification. The protection switching protocol is not "hitless" and, hence, data will be lost during the process. Although 50 milliseconds is a short period of time, data loss can be significant for higher rate line speeds. Therefore, the quicker the switch, the less data loss will occur in the network. The ability to measure a network's actual switch time is necessary for: verifying that the equipment meets the recognized standards; insuring that the protection switch will provide the level of service expected; and assessing the performance of different networks and manufacturers from a competitive standpoint.

When a protection switch occurs in a SONET network, there is a temporary interruption in the signal transported by the network. Initially, the working circuit path is good, and the test set receiver is in pattern sync. However, when a failure such as a fiber cut occurs in the network, there is a switch initiation period (the time it takes to detect the failure condition and initiate a switch). It is during the switch initiation period that the path receiver begins to first experience errors in the path monitoring section of the element and a loss of pattern is detected in a test set receiver. Within 10 milliseconds, a switch to protect should be initiated. A SONET AIS-P (path level alarm) is generated within 125 µsec of detecting the failure condition. Within 50 msec, the path receiver enters an error free path condition and the test set is in pattern sync and runs error free.

Prior art methods of measuring protection switch time, known to the inventors, are either inaccurate or require multiple pieces of test equipment. For example, one method is to measure errors with a test set and calculate the error burst duration. This technique makes certain assumptions regarding the distribution of errors. The user records the bit error count recorded during a protection switch event. It is assumed that the test pattern is pseudo random and that a 50% error density is recorded due to the autocorrelation properties of the bit pattern sequence when not pattern locked. The protection switch time is calculated by multiplying the number of errors by the bit period and by doubling this amount due to the error density assumption. This method assumes that all errors are side by side; durations of no errors are not counted. In real applications, however, errors do not occur in an even distribution but rather occur in bursts separated by periods of no errors. Therefore, this method can lead to widely varied and inaccurate results.

A more accurate result under the prior art requires the manual use of multiple pieces of test equipment such as a test set with error output and an oscilloscope. The test set is used to detect the pattern bit error. The test set outputs pulses for each bit error during the protection switch event. Each pulse is recorded by the oscilloscope as a voltage transition. The user then manually measures the duration of errors from the beginning of the first error to the last error using the oscilloscope time-base. The protection switch time is the time between the first and last error recorded by the user.

Accordingly, there is a need for a method of measuring protection switch time that is accurate, automatic, and does not require multiple pieces of equipment.

SUMMARY OF THE INVENTION

An automated precision measurement device is provided for determining the protection switch time of SONET/SDH or asynchronous networks. Using digital error detection and gated counter techniques to precisely and automatically measure the error burst duration, the device provides an accurate measurement of the time required for a network element to switch from a defective line to a protected line for the purpose of delivering error free service to customer premises. The invention utilizes a timer which is started upon the detection of the first error. Data from the timer is stored upon the detection of subsequent errors to permit a precise calculation of the time between the first error present to the last error present, inclusive. If the measurement was made during a protection switch event in the network element, then the time of the error burst duration represents an accurate measurement of the protection switch time that affected the service.

DETAILED DESCRIPTION

Figure 1:
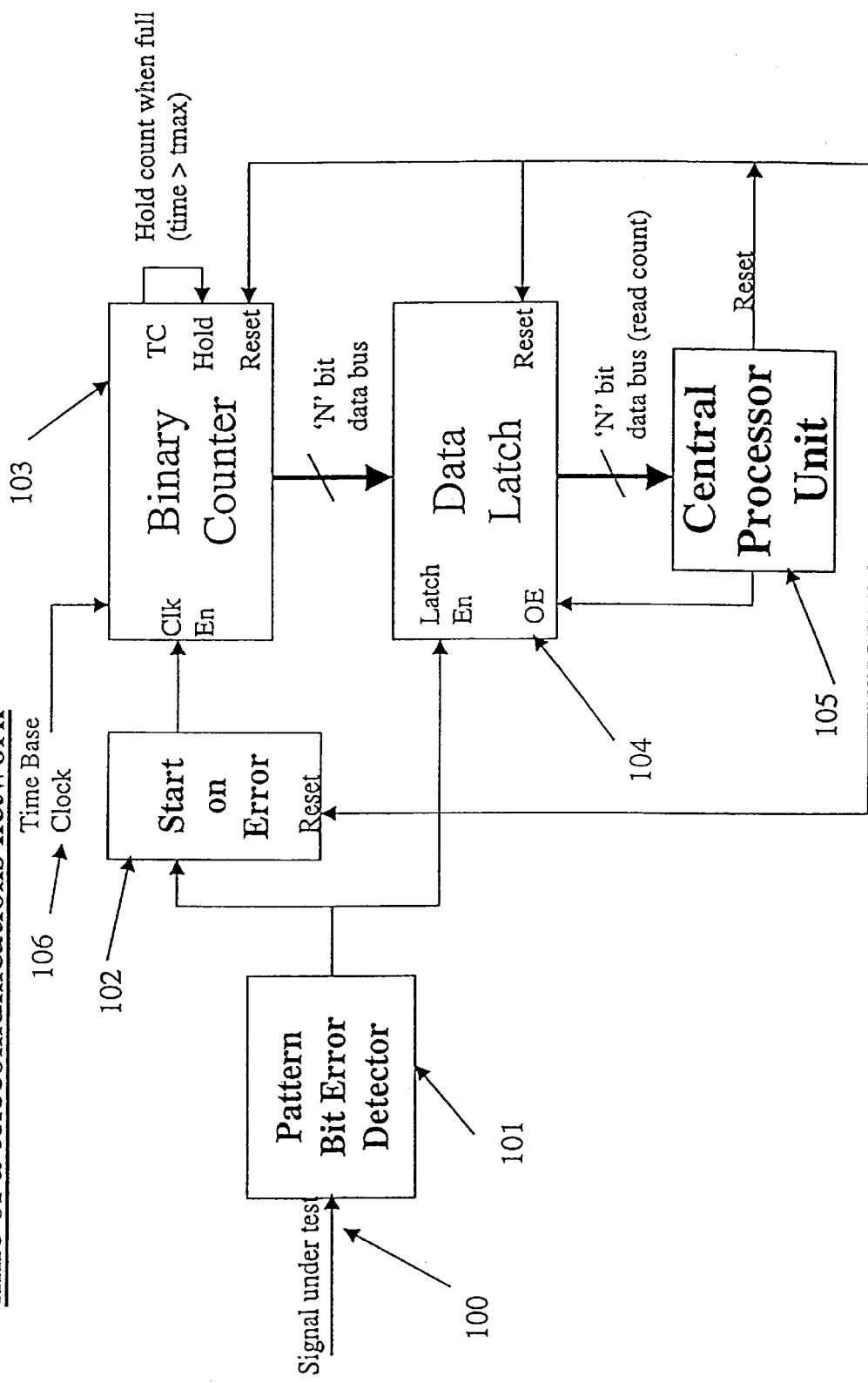
FIG. 1 is a block diagram of a device illustrating one embodiment of the invention.

FIG. 1 shows a simplified block diagram of the measurement system of a digital transmission test set, illustrating one embodiment of the invention.

The input signal under test 100 is applied to a pattern bit error detector 101. The pattern bit error detector 101 generates a referee pattern that is identical to the pattern applied via the signal under test 100' The pattern bit error detector 101 has circuitry that will align the reference pattern with the signal under test 100 such that the bit error output will output pulses for each error detected. The bit error output signal is applied to the start on error circuit 102 and the data latch circuit 104. After a reset is applied by the central processor unit 105 and until an error is output from the pattern bit error detector 101, the start on error 102 Q output is in a disabled condition preventing the binary counter 103 from counting.

After the first error is output from the pattern bit error detector 101, the start on error 102 Q output will be enabled such that the binary counter 103 will begin counting. This condition will remain until, under user command, the central processor unit 105 issues another reset. Once the binary counter 103 is enabled from this first error event it will count in units of time based on the time base clock 106. Each additional error that occurs will store the current count in the binary counter 103 into the data latch 104. Thus, the data latch 103 contains the time between the fist error and the last error that occurs with the precision of the time base clock 106.

The data latch 104 is polled by the central processor unit 105 periodically to update the user interface with these time readings. The capacity of the Binary Counter 103 and Data Latch 104 is determined by the maximum time, and time resolution required by the application.

Two measurement modes are available with the preferred embodiment. In the first, the device accepts a line side signal, demultiplexes a payload test pattern from the standard mapping, and analyzes the payload pattern for errors. If errors are present, the device further measures the time that the errors persist (e.g., the time between the first error present to the last error present, inclusive). If the measurement was made during a protection switch event in the network element, then this time represents an accurate measurement of the protection switch time that affected the service. In the second mode, the device will measure the signal with embedded test pattern as demultiplexed from the terminal itself yielding a measurement from a customer interface point.

From the above description, many variations will be apparent to one skilled in the art that would yet be encompassed by the spirit and scope of the invention. The above description is included to illustrate the operation of the preferred embodiment and is not meant to limit the scope of the invention. The scope of the invention is to be limited only by the following claims.

What is claimed is:

1. A method of automatically measuring network protection switch time comprising:

selecting an interval in which to measure network protection switch time, said interval being greater than the expected network protection switch time;

detecting a first error in a signal in a network within said interval;

starting a timer upon detecting said first error;

detecting subsequent errors in said signal during said interval;

storing data from the timer upon detecting said subsequent errors; and processing said stored data to calculate the time difference between said first error and the last of said subsequent errors;

whereby said time difference represents said network protection switch time.

2. The method of claim 1 further co rising the step of
   demultiplexing the signal from the network prior to detecting the first or subsequent errors.

3. The method of claim 1 wherein said signal is a payload test pattern.

4. The method of claim 1 wherein said network is a SONET/SDH network.

5. A device for automatically measuring network protection switch time comprising:

an error detector for measuring errors in a signal in a network during an interval, said interval being greater than the expected network protection switch time;

a timer connected to said error detector which starts counting when said error detector detects a first error;

a storage circuit for storing data from said timer when said detector detects subsequent errors;

a processor connected to said storage circuit which calculates the time difference between said first and the last of said subsequent errors based on said stored data;

whereby said time difference represents said network protection switch time.

6. The device of claim 5 further comprising:
   a demultiplexer for demultiplexing the signal from the network.

7. The device of claim 5 wherein said signal is a payload test pattern.

8. The device of claim 5 wherein said network is a SONET/SDH network.

* * * * *

UNITED STATES PATENT AND TRADEMARK OFFICE
CERTIFICATE OF CORRECTION

| | | |
|---|---|---|
| PATENT NO. | : 6,545,976 B1 | Page 1 of 1 |
| APPLICATION NO. | : 09/159633 | |
| DATED | : April 8, 2003 | |
| INVENTOR(S) | : Gerald T. Gentile et al. | |

It is certified that error appears in the above-identified patent and that said Letters Patent is hereby corrected as shown below:

On the title page of the patent, (73) Assignee, should read as follows:

--Digital Lightwave, Inc., Clearwater, FL (US)--

Signed and Sealed this
Twenty-seventh Day of October, 2015

Michelle K. Lee
*Director of the United States Patent and Trademark Office*